UNITED STATES PATENT OFFICE.

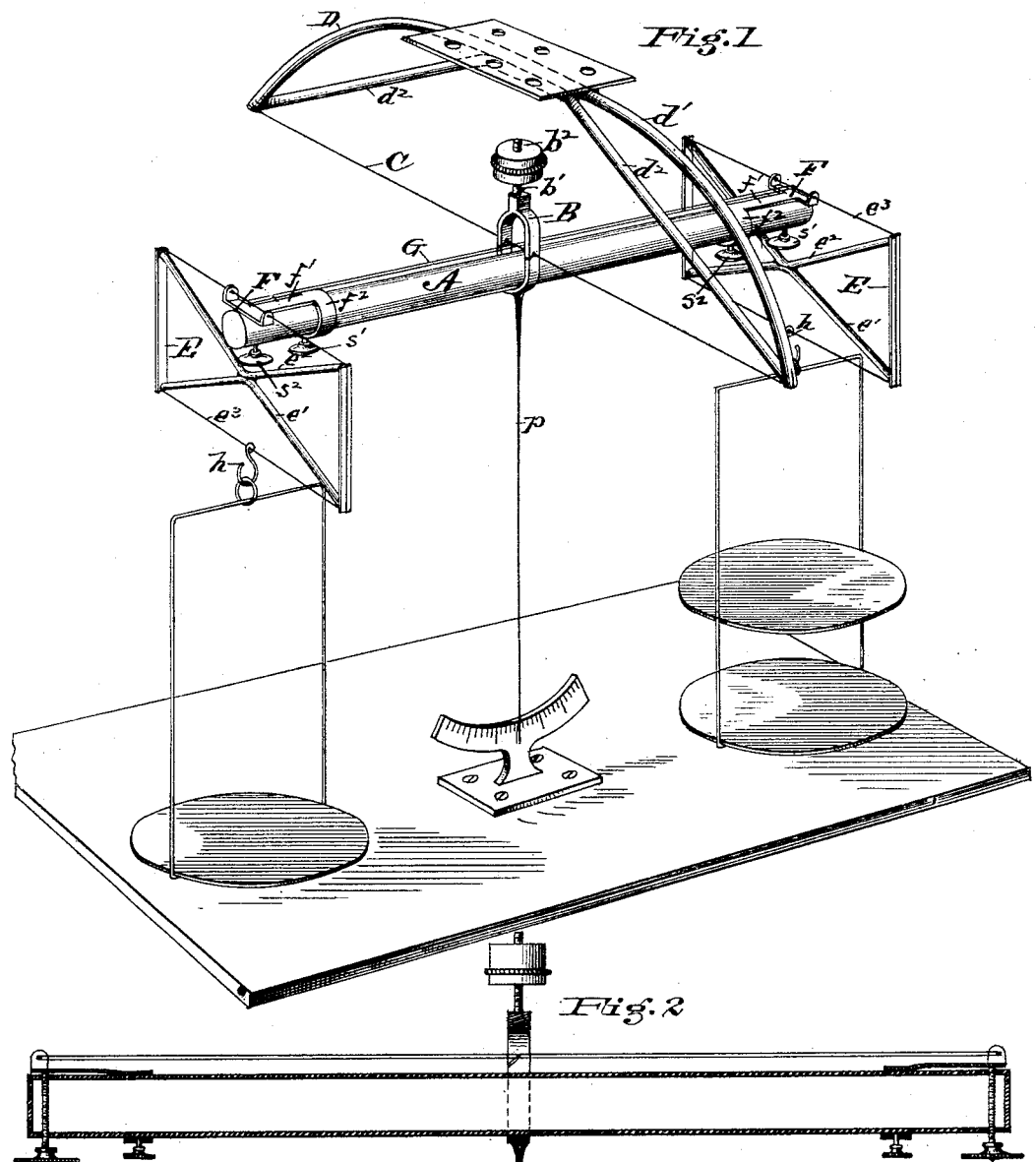

FREDERICK A. ROEDER, OF CINCINNATI, OHIO, ASSIGNOR TO H. F. REUM, OF SAME PLACE, AND ALFRED SPRINGER.

TORSIONAL PIVOT-SCALE BEARING.

SPECIFICATION forming part of Letters Patent No. 262,907, dated August 15, 1882.

Application filed February 15, 1881. (Model.)

*To all whom it may concern:*

Be it known that I, FREDERICK A. ROEDER, a citizen of the United States, residing at Cincinnati, Hamilton county, Ohio, have invented new and useful Improvements in Balances, of which the following is a specification.

My invention relates to balances or weighing-scales, and is especially applicable to those used for weighing minute quantities of matter, and particularly such as are used by chemists and pharmacists, where great accuracy is required; and it consists in the construction and arrangement of parts, as hereinafter set forth, whereby a much more sensitive, durable, and economical scale is produced.

The main feature of my invention consists in substituting for the ordinary "knife-edge" bearings of the beam and the terminal pendants stretched metal wires so arranged as to furnish, by means of their torsional elasticity, extremely-sensitive pivotal bearings preserving at all times their proper mutual relations, and also in the means whereby the proper tension of the wires is maintained, and a proper adjustment of the parts secured.

The torsional elasticity of a metal wire has been before utilized in certain apparatus as an axis of rotation—as, for example, in suspending magnets in observatories. It has also been employed for the central pivotal bearing of a scale-beam, stretched between heavy ordinary abutments. All attempts to make use of the wire as the pivotal supports for the terminal pendants, however, have proved failures, principally because of the impossibility of maintaining the necessary tension of the wire without unduly increasing the weight of the beam in providing supports of a sufficient degree of rigidity and fixedness to resist the strain of the wire stretched between. In scales for delicate laboratory manipulations this increase of weight is a fatal objection. In the present invention I have avoided all objections of this nature, and produced a balance of far greater delicacy than any of which I have any knowledge, and far cheaper than balances ordinarily used for delicate manipulations.

My invention is embodied in mechanism illustrated in the accompanying drawings, in which—

Figure 1 is a perspective view of my improved balance complete, but detached from its containing-case; and Fig. 2 a longitudinal section of the scale-beam, showing the parts for adjusting the main supporting-wires in the same plane.

Similar letters of reference indicate similar parts in specification and drawings.

In the drawings, A designates the scale-beam, which is preferably a straight metal tube of suitable length, supported centrally by means of a yoke, B, upon a wire, C, stretched in a frame, D, upheld upon a pedestal or other suitable support (omitted in the drawings) from a base-plate in the usual manner.

The frame D consists of a bow-shaped frame, $d'$, strengthened by chord-pieces $d^2$, so that the wire C, which serves as the supporting-pivot of the scale-beam, may be stretched and permanently secured between the terminal points of the bow. The bow $d'$ and chord-struts $d^2$ are preferably of metal tubing, securing strength and lightness, and the pivotal wire preferably of steel or other elastic metal. The frame is supported upon its pedestal so that the wire may be horizontal and at right angles to the axis of the scale-beam.

The yoke B, by which the beam is supported, is a U-shaped band of metal inverted above and embracing between its ends the scale-beam, to which it is permanently secured. Above the beam the yoke is pierced through both its sides horizontally at right angles to the beam with slots opening through corresponding edges of the yoke for convenience of placing it upon the wire C, from which it is to remain suspended, and at the top of the yoke, upon a vertical standard, $b'$, is arranged an adjustable weight, $b^2$, for the purpose of compensating the weight of the pointer $p$, projecting beneath the scale-beam in the same vertical line. The scale-beam being suspended, as thus indicated, on the wire C and properly adjusted, and the connection between the yoke and wire being securely soldered or otherwise made rigid, it will be seen that the oscillation of the beam can only occur through the torsional elasticity of the wire upon which it is suspended.

The pendant supports containing the scale-pans are constructed and arranged in the following manner:

I provide for each of the pendants a frame,

E, composed of two bows, $e'$ $e^2$, preferably constructed of metal tubing, combining strength and lightness, placed back to back, thus forming practically diagonal braces for a wire, $e^3$, stretched between and secured to the terminal ends of the braces. The scale-pan is suspended centrally from one of the long sides of the rectangular wire frame thus constituted from a hook, $h$, permanently soldered to the wire, while the frame itself is suspended from the scale-beam centrally upon the opposite side of the wire frame by the following means:

I provide a supporting-piece, F, being formed of a flat strip of metal turned up at the ends and having a V-shaped slot cut in its upturned edges, across and in which the wire is to rest. The supporting-piece F is secured at the ends of a short strip, $f'$, which at the other end is secured to a collar, $f^2$, surrounding the scale-beam and adjustable thereto by a set-screw, $s'$. By this means a radial and also a longitudinal adjustment of the supporting-piece F in relation to the scale-beam is secured. A further means of adjusting the supporting-piece F is had in a set-screw, $s^2$, which passes through the scale-beam A from below and supports the piece F upon its end by contact merely. The object of this adjustment is to bring the end supports in line with the central pivotal wire, C, and parallel with the longitudinal axis of the beam A. The supporting-piece F being adjusted to its position, the frame E is hung thereupon, its upper horizontal wire resting across and in the slots of the upturned ends of the piece F, and soldered or otherwise rigidly secured thereto. It will be seen that by this arrangement of parts the pendant maintains its vertical position under oscillations of the scale-beam by the joint torsional action of the upper and lower supporting-chords of the frame E, a similar connection being provided for each pendant at the ends of the scale-beam.

A fine wire or hair, G, stretched between the terminal pivots of the scale-beam, furnishes a guide for the proper adjustment of the parts.

It will be obvious that the frames for securing the pivotal wires may be varied as to their form of construction and materials; but after many experiments I prefer that shown and described as affording an economical construction answering all practical necessities.

Among the principal advantages resulting from my invention are the extreme simplicity and economy of construction, by which a balance capable of the most delicate and accurate manipulation may be cheaply produced, and also one not susceptible to injury from the acid fumes of the laboratory or deterioration from the weather, and which requires no special care to preserve the pivotal supports from such deterioration, as it will be obvious that the rusting of the wires will not affect the operation of the parts unless the corrosion is so excessive as to require a renewal of the wires, which is easily and economically effected.

Another important advantage of my invention is in the elasticity of the wires themselves, which tend to keep the scale-beam oscillating, thereby tending to a more accurate result in weighing minute quantities, whereas the usual knife-edge supports tend to arrest such motion.

It will be obvious that the principles of my invention may be advantageously applied in constructing scales for weighing heavier articles, in which case the pivotal wires may be arranged in the plane of the axis of the beam, and the pointer arranged above the beam instead of below, and the frame D inverted and supported from below upon a simple standard.

Having described my invention, I claim and desire to secure by Letters Patent—

1. A scale-beam having its fulcrum-support and terminal pendant connections formed of stretched metallic wires acting torsionally, as set forth.

2. The frame D, constructed of a bow and radial struts, and a wire held in tension between the ends of the bow, in combination with a scale-beam supported by the wire as a torsional fulcrum, substantially as set forth.

3. In combination with the scale-beam A, the frame E, having diagonal braces holding wires in tension used as the terminal supports for the scale-pendants, substantially as set forth.

4. In combination with the scale-beam A and terminal pendants supported by a stretched wire, the adjustable supporting-pieces F, as specified.

5. In combination with the scale-beam A and pendants, the supporting-pieces F, connecting-pieces $f'$, collars $f^2$, and set-screws $s'$ and $s^2$, substantially as specified.

In testimony whereof I have hereunto set my hand and seal in the presence of two subscribing witnesses.

FREDERICK A. ROEDER. [L. S.]

Witnesses:
L. M. HOSEA,
C. P. DOOLITTLE.